US012118413B2

(12) United States Patent
Elluri

(10) Patent No.: US 12,118,413 B2
(45) Date of Patent: *Oct. 15, 2024

(54) AGGREGATED HEALTH MONITORING OF A CLUSTER DURING TEST AUTOMATION

(71) Applicant: Red Hat, Inc., Raleigh, NC (US)

(72) Inventor: Naga Ravi Chaitanya Elluri, Toronto (CA)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/220,036

(22) Filed: Jul. 10, 2023

(65) Prior Publication Data

US 2023/0367661 A1 Nov. 16, 2023

Related U.S. Application Data

(63) Continuation of application No. 17/104,380, filed on Nov. 25, 2020, now Pat. No. 11,698,824.

(51) Int. Cl.
*G06F 9/54* (2006.01)
*G06F 9/455* (2018.01)
*G06F 11/07* (2006.01)
*G06Q 10/10* (2023.01)

(52) U.S. Cl.
CPC .......... *G06F 9/547* (2013.01); *G06F 9/45558* (2013.01); *G06F 11/0709* (2013.01); *G06F 11/0769* (2013.01); *G06F 2009/45595* (2013.01); *G06Q 10/10* (2013.01)

(58) Field of Classification Search
None
See application file for complete search history.

(56) References Cited

U.S. PATENT DOCUMENTS

| | | |
|---|---|---|
| 8,601,441 B2 | 12/2013 | Kaulgud et al. |
| 9,110,496 B1 | 8/2015 | Michelsen |
| 9,424,171 B1 | 8/2016 | Chirgwin et al. |
| 10,691,514 B2 | 6/2020 | McClory et al. |

(Continued)

OTHER PUBLICATIONS

Elluri, "OpenShift Scale-CI: Part 4: Introduction to Cerberus—Guardian of Kubernetes/OpenShift Clouds", Apr. 22, 2020 (5 pages).

(Continued)

*Primary Examiner* — Syed A Roni
(74) *Attorney, Agent, or Firm* — Kilpatrick Townsend & Stockton LLP

(57) ABSTRACT

A system includes a cluster of nodes, memory, and a processor, where the cluster includes an application programming interface (API) server and one or more components. The processor is configured to initialize an interface to the API server, where the interface is operable to send status information from the one or more components within the cluster via a single output stream. The API server is configured to modify the single output stream of the API server to output status information associated with a first component of the one or more components within the cluster. The status information is aggregated and it is determined whether the cluster is at a failure point. In response to determining that the cluster is at a failure point, an execution signal is set to false, where the execution signal is accessible to an automation tool in communication with the cluster.

19 Claims, 5 Drawing Sheets

(56) References Cited

U.S. PATENT DOCUMENTS

2013/0013953 A1   1/2013  Eck et al.
2014/0019093 A1   1/2014  Masser
2018/0052762 A1*  2/2018  Vyas .................. G06F 11/3668
2019/0097900 A1   3/2019  Rodriguez et al.
2019/0317754 A1  10/2019  Mosquera et al.

OTHER PUBLICATIONS

AWS Well-Architected Framework; Amazon Web Services, Inc.; https://d1.awsstatic.com/whitepapers/architecture/AWS_Well-Architected_Framework.pdf; Jul. 2020; Accessed on or before Oct. 6, 2020; (97 pages).

Fedeczko, "Continuous Monitoring and Observability in CI/CD", Mar. 18, 2020 (8 pages).

USPTO; Non-Final Office Action for U.S. Appl. No. 17/104,380 dated Sep. 20, 2022.

* cited by examiner

AGGREGATED HEALTH MONITORING OF A CLUSTER DURING TEST AUTOMATION

CROSS-REFERENCE TO RELATED APPLICATIONS

The present application is a continuation of U.S. patent application Ser. No. 17/104,380, filed on Nov. 25, 2020, the disclosure of which is incorporated herein by reference for all purposes.

BACKGROUND

Computer systems may run applications or services that are provided via a server or cloud. The applications or services can be developed and deployed at runtime. Application instances or services may run within containers, which may be run on physical or virtual machines. The containers may be used to separate various components of a computing system. For example, different components of a computing system may be executed at different containers and/or virtual machines executing on a computing device or multiple computing devices. Maintenance and/or modifications to installed service and/or applications may often be applied in various server or cloud environments which may be continuously evolving.

SUMMARY

The present disclosure provides new and innovative systems and methods for monitoring components of a cluster of nodes and provide status to automation tools interacting with the cluster. In an example, a method includes initializing an interface to an application programming interface (API) server, where the interface is operable to send status information from one or more components within a cluster via a single output stream. The API server is configured, via the interface, to modify the single output stream of the API server to output status information associated with a first component of the one or more components within the cluster, where the single output stream sends the status information external to the cluster. The status information is aggregated and, based on the aggregated status information received from the API server, it is determined whether the cluster is at a failure point. In response to determining that the cluster is at a failure point, an execution signal is set to false, where the execution signal is accessible to an automation tool in communication the cluster.

In an example, a system includes a cluster of nodes, memory, and a processor. The cluster includes an application programming interface (API) server and one or more components. The processor is in communication with the memory and configured to initialize an interface to the API server, where the interface is operable to send status information from the one or more components within the cluster via a single output stream. The API server is configured, via the interface, to modify the single output stream of the API server to output status information associated with a first component of the one or more components within the cluster, where the single output stream sends the status information external to the cluster. The status information is aggregated and, based on the aggregated status information received from the API server, it is determined whether the cluster is at a failure point. In response to determining that the cluster is at a failure point, an execution signal is set to false, where the execution signal is accessible to an automation tool in communication the cluster.

In an example, a non-transitory machine readable medium storing code, which when executed by a processor is configured to initialize an interface to an API server, where the interface is operable to send status information from the one or more components within the cluster via a single output stream. The API server is configured, via the interface, to modify the single output stream of the API server to output status information associated with a first component of the one or more components within the cluster, where the single output stream sends the status information external to the cluster. The status information is aggregated and, based on the aggregated status information received from the API server, it is determined whether the cluster is at a failure point. In response to determining that the cluster is at a failure point, an execution signal is set to false, where the execution signal is accessible to an automation tool in communication the cluster.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

Techniques are disclosed for providing an ability to monitor and/or manage automation executing within a cluster of nodes from a single output stream. Typically, cluster monitoring systems (e.g., Prometheus) are large unwieldy applications that touch many components, devices, and/or systems within a cluster. Often, a cluster monitoring system requires installing multiple agents, libraries and/or components throughout a cluster to retrieve data, which both affect, and are affected by, performance of the cluster. Generally, while cluster monitoring systems acquire various types of data from a cluster, cluster monitoring systems often merely report information about a system without awareness of a cluster's current state. Typically, occurrences of hardware and/or software failures of a cluster may reduce reliability of data collected from the cluster and may affect a health monitor's ability to determine a health and/or status of the cluster. Generally, cluster monitoring systems fail to prevent cluster failure without external intervention.

As described in various examples disclosed herein, to facilitate monitoring and maintaining stability of a cluster of nodes, the systems and methods disclosed herein advantageously interfaces an external health monitor with an application programming interface (API) server within a cluster to retrieve and/or aggregate data from one or more devices, components, applications, and/or nodes within the cluster to determine an aggregated status and/or health of the cluster. Monitoring a cluster from an external location allows a health monitor to avoid affecting the cluster's performance and prevents the health monitor from being affected by any potential component failures within the cluster. Additionally, in most implementations, external monitoring allows a health monitor to objectively determine a cluster's health and provide an indicator of an impending cluster failure to automation and applications executing within the cluster.

Figure 1A:
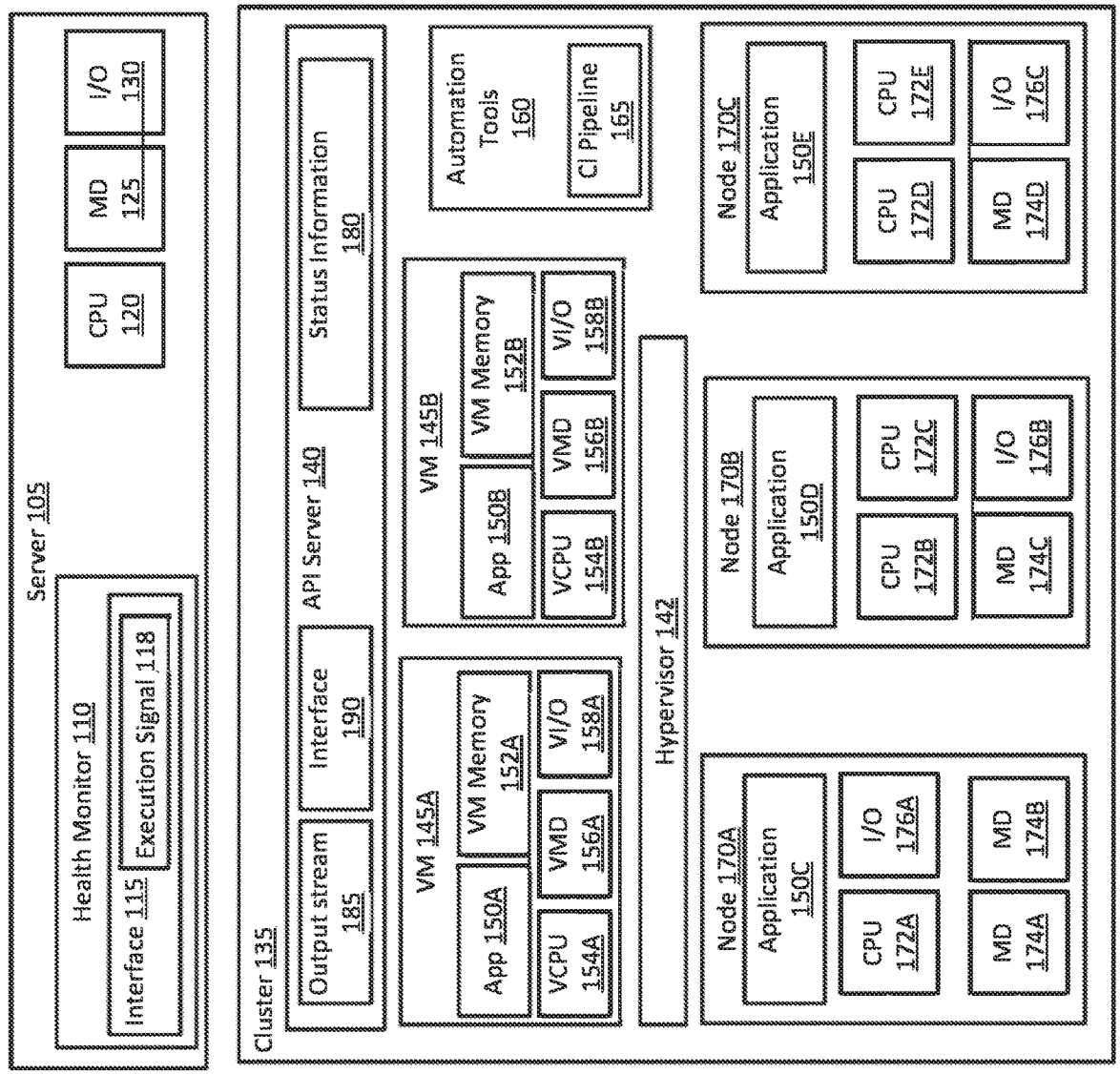
FIGS. 1A and 1B illustrate a high level component diagram of an example computing system in accordance with one or more aspects of the disclosure.

FIG. 1A depicts a high-level component diagram of an example computing system 100 in accordance with one or more aspects of the present disclosure. As shown in FIG. 1A, the computing system 100 may include a cluster 135 and a server 105. The cluster may include an application programming interface (API) server 140, nodes (e.g., nodes 170A-C, 170 generally), one or more virtual machines (VM) (145A-B, 145 generally), automation tools 160, and a hypervisor 142. In some implementations, the automation tools 160 may be executing in a location external to the cluster 135 (e.g., server 105). The hypervisor 142 may create and/or run the VM 145.

As shown in FIG. 1A, server 105 may include CPU 120, memory device 125, and I/O device 130. In at least one example, a health monitor 110 may be executing on the server 105 and be in communication with an API server 140 of the cluster 135. For example, health monitor 110 executing on the server 105 may initialize interface 190 to communicate with API server 140. In at least one example, the health monitor 110 may configure the API server, via the interface 190, to modify the output stream 185 to output the status information 180. In yet another example, an automation tool 160 may obtain access to an execution signal 118 through an interface 115. In some implementations, the interface 115 may be a web interface (e.g., through an http://address).

In many examples, an automation tool 160 may execute tests from a continuous integration pipeline 165. A continuous integration pipeline 165 may include various types of tests including, but not limited to, chaos, scale, and performance tests. For example, chaos testing may include simulating a device (e.g., a cpu, storage device, network device) or component (e.g., application, service, node, VM) being disabled within the cluster 135. A scale test may include providing various magnitudes (e.g., 1,000 or 1,000,000 service requests) of inputs to one or more components within the cluster 135. A performance test may include determining performance of one or more components during various conditions (e.g., with a set number of available hardware and/or software resources). In some instances, an automation tool 160 may determine whether to start automation, continue automation, stop automation, or modify automation based on the execution signal 118. For example, in one instance, an automated stress testing tool (e.g., automation tool 160) may send stimulus to application 150A (e.g., 1 million requests) to determine whether the application 150A is able to withstand receiving the stimulus in a short amount of time. During stress testing of application 150A, application 150A, VM 145A, hypervisor 142 may send information to API server 140 related to status information 180 of the application 150A. The health monitor 110 receives the status information 180 through interface 190 and is operable to aggregate the status information 180 and determine whether or not one or more portions of the cluster 135 may potentially fail or is near a failure point. In response to determining that the cluster 135 is approaching a failure point, the health monitor 110 may publish an execution signal 118 indicating that the automation tools 160 should modify stress testing of application 150A. In some instances, automation tools 160 stop all stimulus to the application 150A. In other instances, automation tools 160 reduce an amount of stimulus to the application 150A.

Virtual machines 145A-B may include a virtual machine memory (VM Memory), a virtual CPU (VCPU), virtual memory devices (VMD), and virtual input/output devices (VI/O). For example, virtual machine 145A may include virtual machine memory 152A, a virtual CPU 154A, a virtual memory devices 156A, and a virtual input/output device 158A. Similarly, virtual machine 145B may include virtual machine memory 152B, a virtual CPU 154B, a virtual memory devices 156B, and virtual input/output device 158B. In an example, Applications 150A-E may be different applications or services. In another example, applications 150A-E may be different instances of the same application or service.

In an example, a virtual machine 145A may execute a guest operating system and run applications 145A which may utilize the underlying VCPU 154A, VMD 156A, and VI/O device 158A. One or more applications 150A may be running on a virtual machine 145A under the respective guest operating system. A virtual machine (e.g., VM 145A-B, as illustrated in FIG. 1) may run on any type of dependent, independent, compatible, and/or incompatible applications on the underlying hardware and operating system ("OS"). In an example, applications (e.g., App 145A-B) run on a virtual machine 145A may be dependent on the underlying hardware and/or OS. In another example embodiment, applications 150A executing on a virtual machine 170A may be independent of the underlying hardware and/or OS. For example, applications 145A run on a first virtual machine 145A may be dependent on the underlying hardware and/or OS while applications (e.g., application 145B) executing on a second virtual machine (e.g., VM 145B) are independent of the underlying hardware and/or OS. Additionally, applications 150A run on a virtual machine 145A may be compatible with the underlying hardware and/or OS. In an example embodiment, applications 150A run on a virtual machine 145A may be incompatible with the underlying hardware and/or OS. For example, applications 150A run on one virtual machine 145A may be compatible with the underlying hardware and/or OS while application 150B executes on another virtual machine 145B and is incompatible with the underlying hardware and/or OS.

In an example, virtual machines 145A-B may instead be containers that execute applications or services, such as microservices. In an example, the containers may each run a process or service and the containers may be any execution environment. For example, the containers may be a virtual server. It should be appreciated that containers may be stand alone execution environments, similar to that of a virtual machine. The applications 150A-E or services (e.g., microservices) may run in a software container, a virtual machine (e.g., virtual machines 145A-B), or a node (e.g., nodes 170A-C, 170 generally).

The computer system 100 may include one or more nodes 170A-C. Each node 170A-C may in turn include one or more physical processors (e.g., CPU 172A-E) communicatively coupled to memory devices (e.g., MD 174A-D) and input/output devices (e.g., I/O 176A-C). Each node 170A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 145A-B may be provisioned on the same host or node (e.g., node 170A) or different nodes. For example, VM 145A and VM 145B may both be provisioned on node 170A. Alternatively, VM 145A may be provided on node 170A while VM 145B is provisioned on node 170B.

As used herein, physical processor or processor 172A-E refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 174A-D refers to a volatile or non-volatile memory device, such as RAM, ROM, EEPROM, or any other device capable of storing data. As discussed herein, I/O device 176A-C refers to a device capable of providing an interface between one or more processor pins and an external device capable of inputting and/or outputting binary data.

Processors (e.g., CPUs 172A-E) may be interconnected using a variety of techniques, ranging from a point-to-point processor interconnect, to a system area network, such as an Ethernet-based network. Local connections within each node, including the connections between a processor 172A-E and a memory device 174A-D may be provided by one or more local buses of suitable architecture, for example, peripheral component interconnect (PCI).

Figure 1B:
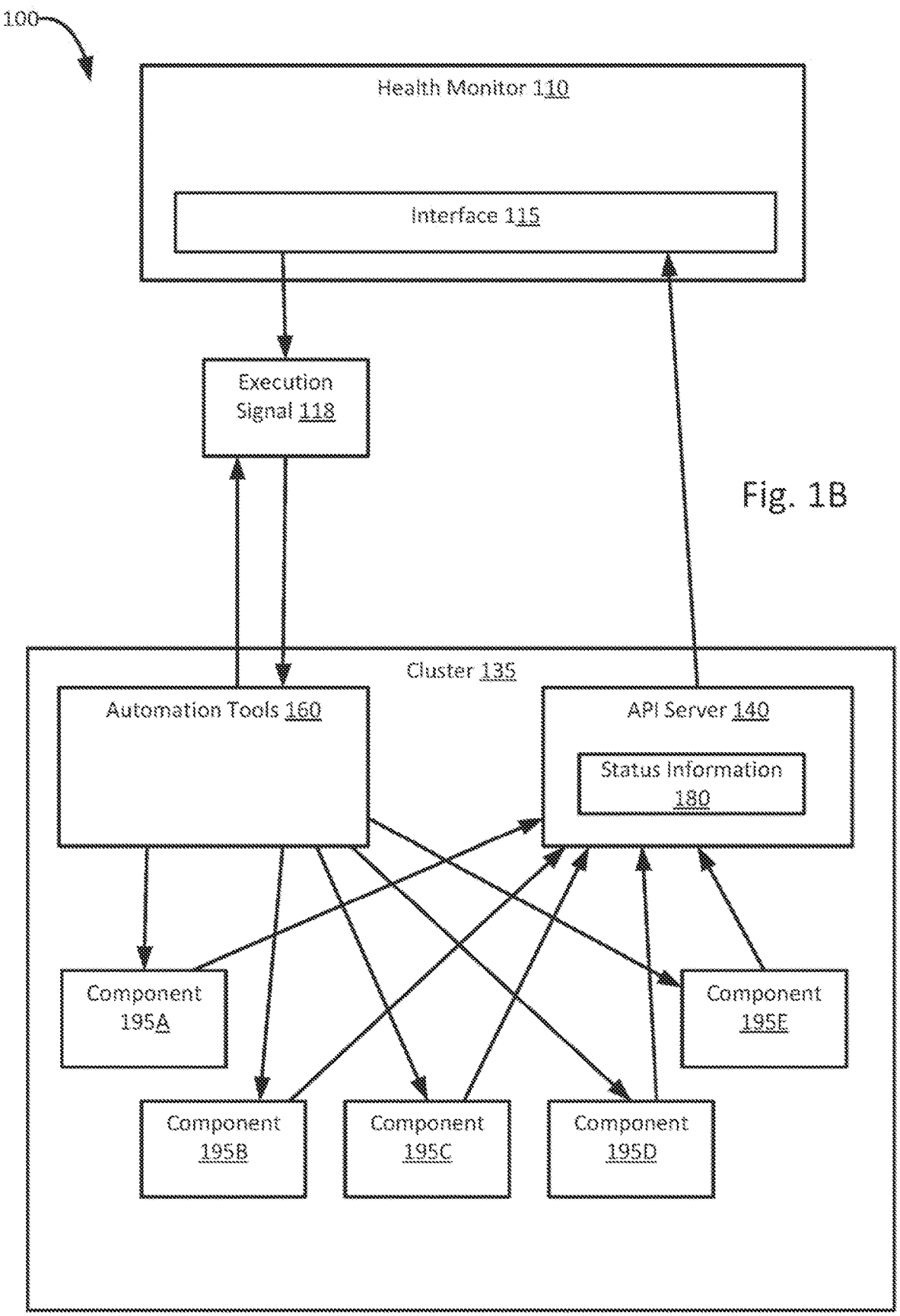

FIG. 1B depicts a high-level component diagram showing communication between components of an example computing system in accordance with one or more aspects of the present disclosure. As shown in FIG. 1B, the cluster 135 includes automation tools 160, application programming interface (API) server 140, and components (195A-E, 195 generally). In various examples, a component 195 may include, but is not limited to, an application, service, virtual machine, node, physical hardware and/or virtual hardware within the cluster 135. For example, component 195A may be a database transaction server executing on a virtual machine managing incoming and outgoing transactions related to a database. In another example, component 195B may be a web server executing on a node within the cluster 135 managing requests for content hosted by the web server. In yet another example, component 195C may be a node within the cluster 135 providing physical hardware virtualized by the hypervisor 142 for VMs 145 hosted on the cluster 135.

As shown in FIG. 1B, automation tools 160 are in communication with components 195 and each of components 195 are in communication with the API server 140. Each of the components 195 may send state information to the API server 140 to create status information 180, where the status information 180 is sent to the health monitor 110. State information may include any data associated with a state of a component. For example, state information from a component 195A (e.g., a login server) may include a total number of active users, an amount of physical resources used (e.g., CPU, Memory, data storage), an amount of requests received over a set time frame (e.g., 1 minute, 1 hour, 1 day) and/or other relevant data associated with the component. The health monitor 110 publishes an execution signal indicating whether the cluster 135 is nearing a failure point. In many implementations, a failure point may be a point in time when one or more components fail within a cluster 135. For example, component 195A may be a network switch connecting nodes 170 within a cluster 135. In this example, if the network switch fails, the cluster 135 may be nearing a failure point due to multiple applications and/or devices within the cluster 135 being unable to communicate with each other and/or with anything external to the cluster 135. Similarly, in an alternate example, component 195B may be node 170A from which hypervisor 142 provides virtual hardware to VM 145A. In this example, cluster 135 may near a failure point if component 195B (i.e., node 170A) fails causing VM 145A to fail due to lack of physical hardware to support the virtualization of VM 145A. In various implementations, a failure point may be set and/or configured based on desired or required attributes of the cluster 135. For example, in one instance, a failure point may be configured to include a failure of two or more components 195. In an alternate example, a failure point may be configured to include a failure of ten or more components. In yet another example, a failure point may be configured to include a failure of the hypervisor 142 executing on the cluster 135.

In some instances, an execution signal 118 may be set to true (e.g., if the cluster 135 is fully functional) or false (e.g., if the cluster 135 is nearing a failure point). For example, a health monitor 110 may be tasked with monitoring a login server (e.g., component 195A). In this example, the login server (e.g., component 195A) sends state information to the API server 140, which is sent to the health monitor 110 in a single output stream. During testing, the automation tools 160 stress tests the login server (e.g., component 195A) with thousands of attempted logins to determine if the login server can withstand the thousands of login requests. While testing the login server (e.g., component 195A), if the health monitor 110 determines that the cluster 135 is compromised (i.e., nearing a failure point), the health monitor 110 publishes an execution signal 118 indicating that the cluster 135 has failed or is approaching a failure point (e.g., the execution signal is set to false). In response to detecting that the execution signal 118 is set to false, the automation tools 160 modifies the stress testing. In some instances, upon detecting an execution signal 118 set to false, the automation tools 160 may reduce an amount of stimulus (e.g., login attempts) to the tested component. In other instances, upon detecting an execution signal 118 set to false, the automation tools 160 may stop all stimulus to the tested component.

Figure 2:
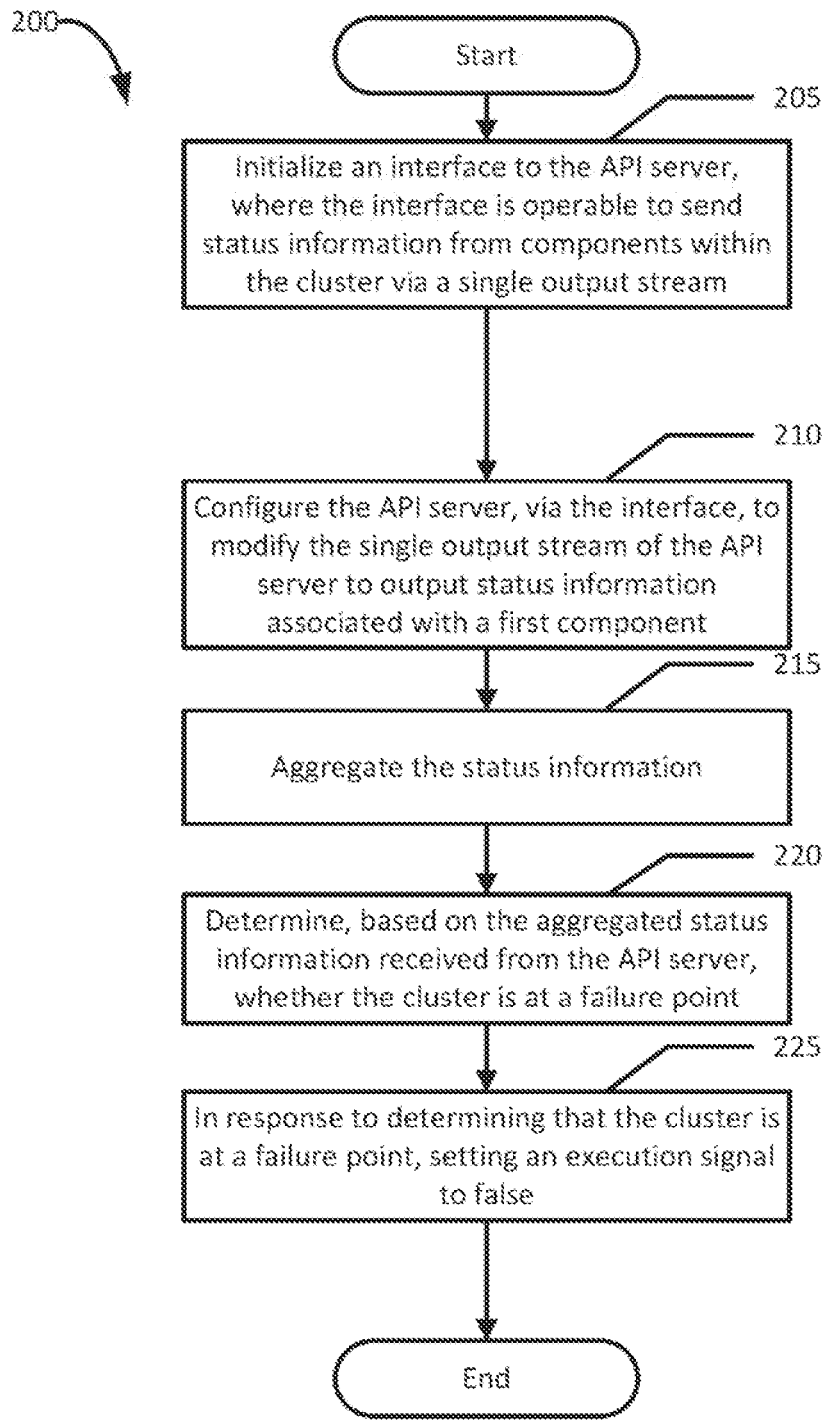
FIG. 2 illustrates a flowchart of an example method of monitoring a cluster via a single output stream in accordance with one or more aspects of the disclosure.

FIG. 2 illustrates a flowchart of an example method of monitoring a cluster of nodes during testing of a component, in accordance with an embodiment of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, blocks may be repeated and some of the blocks described are optional. The method 200 may be performed by processing logic that may comprise hardware (circuitry, dedicated logic, etc.), software, or a combination of both.

As shown in FIG. 2, an example method 200 may begin with initializing an interface to the API server, where the interface is operable to send status information from components within the cluster via a single output stream (block 205). For example, a health monitor 110 may be tasked with, or receive a request to, monitor components 195 (e.g., hypervisor 142, VM 145A, and nodes 170A and 170B) supporting an authentication server for a cloud storage provider. In this example, the health monitor 110 initializes the interface 190 at the API server 140 to gain access to status information 180 stored on the API server 140. The status information 180 may include state information received from components 195 within the cluster 135 (e.g., Hypervisor 142, nodes 170, automation tools 160, etc.), which is sent to the health monitor 110 through a single output stream containing status information 180 for components within the cluster 135.

Next the example method 200 may include configuring the API server, via an interface, to modify a single output stream of the API server to output status information associated with a first component (block 210). A health monitor 110 may configure the API server 140, through the interface 190, to retrieve status information 180 associated with a component (e.g., components 195A) within the cluster 135. For example, to monitor a database stored on node 170A, the health monitor 110 configures the API server 140 to send status information 180 associated with the node 170A. In some implementations, status information 180 associated with node 170A may include, but is not limited to, amount of available physical resources, a total number of users, a total number of active users, network statistics, and/or other relevant information. Next, the example method 200 may include aggregating the status information (block 215). A health monitor 110 aggregates status information 180 by combining data based on relevance to monitored components 195. For example, a health monitor 110 may be monitoring an authentication server executing on node 170A with data stored on node 170B. In this example, the health monitor 110 may receive all status information 180 from nodes 170A and 170B even though only a subset of the total status information 180 is relevant (e.g., relevant information related to the authentication server may include available hardware resources on node 170A and available storage on node 170B). The health monitor 110 aggregates the data by filtering the total status information 180 to data relevant to the authentication server, node 170A, and node 170B. In most implementations, the health monitor 110 stores the status information 180 external to the cluster 135 (e.g., server 105) to isolate received status information 180 from any hardware failure in the cluster 135.

Next, the example method 200 may include determining, based on the aggregated status information received from the API server, whether the cluster is at a failure point (block 220). The health monitor 110 may determine that the cluster 135 is at or nearing a failure point based on whether or not one or more components 195 have failed. For example, a login server monitored by the health monitor 110 is executing on node 170A. The health monitor 110 receives information that memory device 174A has failed, which has compromised node 170A. The health monitor 110 determines that the cluster 135 is at or nearing a failure point because node 170A is compromised. In certain implementations, a failure point may be defined as a single component 195 within the cluster 135 failing. In other implementations, a failure point may be defined as a plurality of components 195 failing within the cluster 135. Next, the example method 200 may include in response to determining that the cluster is at a failure point, setting an execution signal to false (block 225). When the health monitor 110 determines that the cluster 135 is at a failure point, the health monitor 110 publishes an execution signal 118 using interface 115. For example, if a web server is executing on nodes 170A and 170B, and the health monitor 110 determines that a failure point has been reached (e.g., node 170A has experienced a hardware failure), the health monitor 110 may publish the execution signal through a web portal (i.e., the interface 115). In this example, the health monitor 110 sets the execution signal 118 to false because the cluster 135 has reached a failure point. In other examples, the health monitor 110 may set the execution signal 118 to true, indicating that the cluster 135 is fully functional and/or not reached a failure point. In certain instances, a health monitor 110 may modify an execution signal 118 multiple times based on a state of the cluster 135. For example, a cluster 135 may approach a failure point causing the health monitor 110 to set the execution signal 118 to false. In that instance, the automation tools 160 would modify its own operation potentially affecting a functionality and/or stability of the cluster 135. If the stability and/of functionality of the cluster 135 improves, the health monitor may set the execution signal 118 to true, indicating the cluster 135 is again fully functional.

Figure 3:
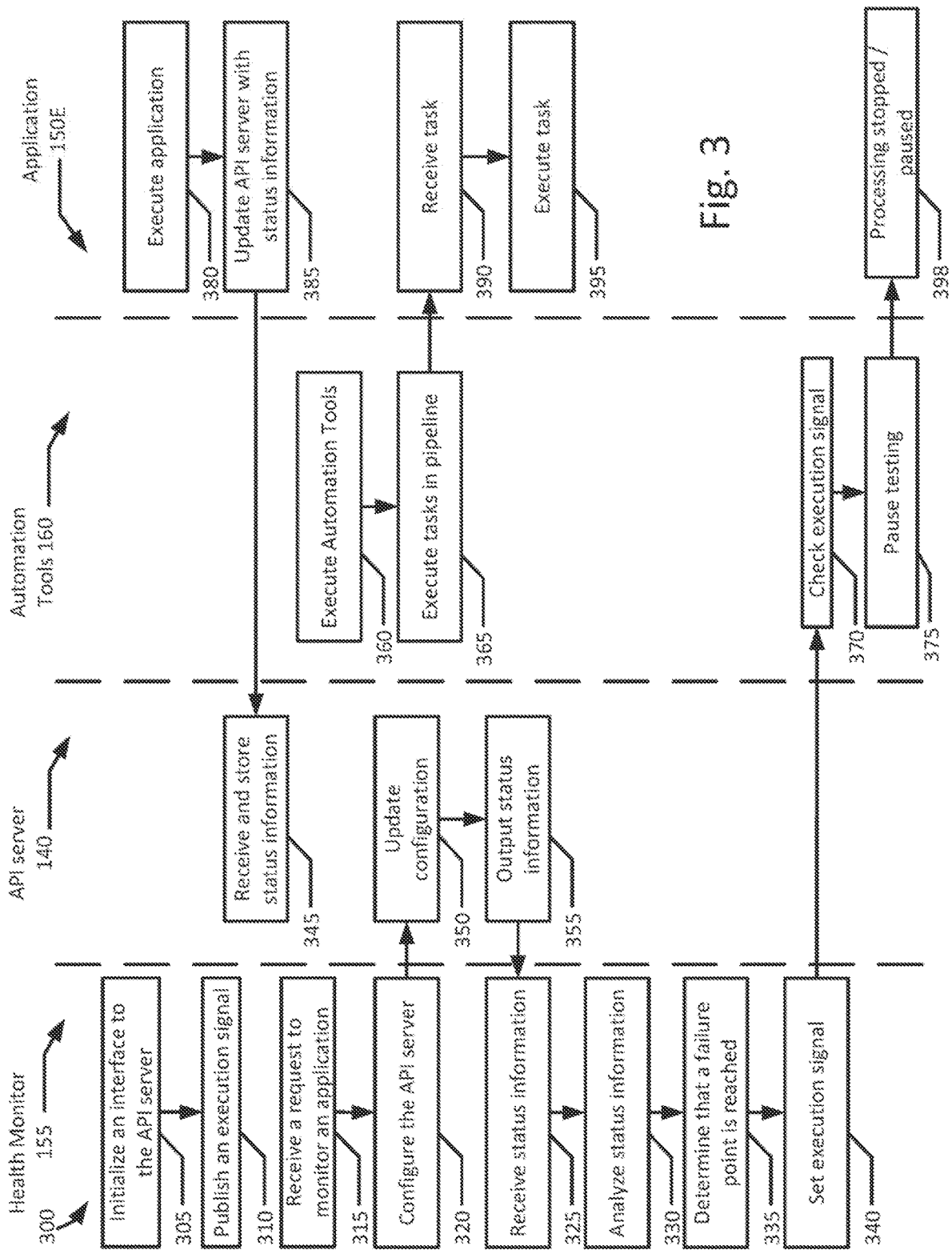
FIG. 3 illustrates a flow diagram of an example method of monitoring an automation tool executing on an example computing system, in accordance with an embodiment of the disclosure.

FIG. 3 illustrates a flow diagram of an example methods of monitoring a cluster of nodes during testing of a component, in accordance with an embodiment of the present disclosure. Although the example method 300 is described with reference to the flow diagram illustrated in FIG. 3, it will be appreciated that many other methods of performing the acts associated with the method 300 may be used. For example, the order of some of the blocks may be changed, certain blocks may be combined with other blocks, blocks may be repeated, and some of the blocks described are optional. For example, in the illustrated flow diagram, a health monitor 155 is in communication with an API server 140 while an application 150E is being testing by automation tools 160.

As shown in FIG. 3, the health monitor 155 initializes an interface 190 to the API server 140 (block 305) and publishes an execution signal 118 using interface 115 (block 310). Initially, the execution signal 118 is set to "true" indicating the cluster 135 is fully functioning and that no components 195 within the cluster 135 have failed. Application 150E executes (block 380) and updates the API server 140 with status information 180 (e.g., time since initialization, total number of active users, latest response time, system connectivity, available resources, etc.) (block 385). For example, application 150E may be an installation of Kubernetes executing on node 170A and node 170C. The API server 140 receives the status information 180 and stores the status information 180 (block 345). For example, Kubernetes (i.e., application 150E) may send status information 180 from node 170A and node 170C to the API server 140. In some implementations, each component 195 (e.g., applications, devices, services, etc.) may send status information 180 to the API server. In other implementations, a subset of a total number of components 195 may send status information 180 to the API server.

As shown in FIG. 3, automation tools 160 are executed (block 360) and executes tasks in the continuous integration pipeline 165 (block 365). For example, the automation tools may be used testing applications 150 on the cluster 135. In this instance, the automation tools 160 includes continuous integration pipeline 165, which includes multiple tests for application 150E (e.g., load tests, chaos tests, etc.). The application 150E receives tasks from the automation tools 160 (block 390) and executes each of the tasks (block 395). For example, a task may include managing a container within Kubernetes (i.e., application 150E). In another example, a task may be orchestrating various containers within Kubernetes. The health monitor 155 receives a request to monitor an application (e.g., application 150E) (block 315) and configures the API server (block 320). For example, the health monitor 155 is able to configure the API server 140 to send status information 180 related to specific components 195 (e.g., node 170A and node 170B) within the cluster 135. The API server 140 updates the configuration (block 350) and starts outputting requested status information (180) in a single output stream 185 (block 355). Upon receiving the status information 180 (block 325), the health monitor 155 analyzes the status information (block 330). For example, the health monitor 155 may analyze the status information 180 to determine if one or more components 195 within the cluster 135 has failed (e.g., hardware failures, application failures, etc.). In other examples, the health monitor 155 may analyze the status information 180 to determine if one or more components 195 within the cluster 135 may be compromised (e.g., a component without enough available resources to be fully functional). In this example, the health monitor 155 determines that a failure point is reached (block 335) and sets an execution signal to false (block 340). In most implementations, the health monitor 155 publishes the execution signal 118 through a web portal. In some instances, the execution signal 118 may be directly sent to one or more applications and/or components within the cluster 135.

In this example, the automation tools 160 periodically checks for the execution signal (block 370). As the execution signal 118 is set to false, the automation tools 160 decides to pause testing of the application 150E. In some instances, an automation tool 160 may reduce an amount of testing in response to the execution signal 118 being set to false. In this instance, as testing has been paused, the application 150E is paused and processing has been stopped (block 398). For example, when an application 150E (e.g., Kubernetes) stops receiving any stimulus (e.g., messages, requests, instructions, etc.) from the automation tools 160, processing stops after the last stimulus received.

Figure 4:
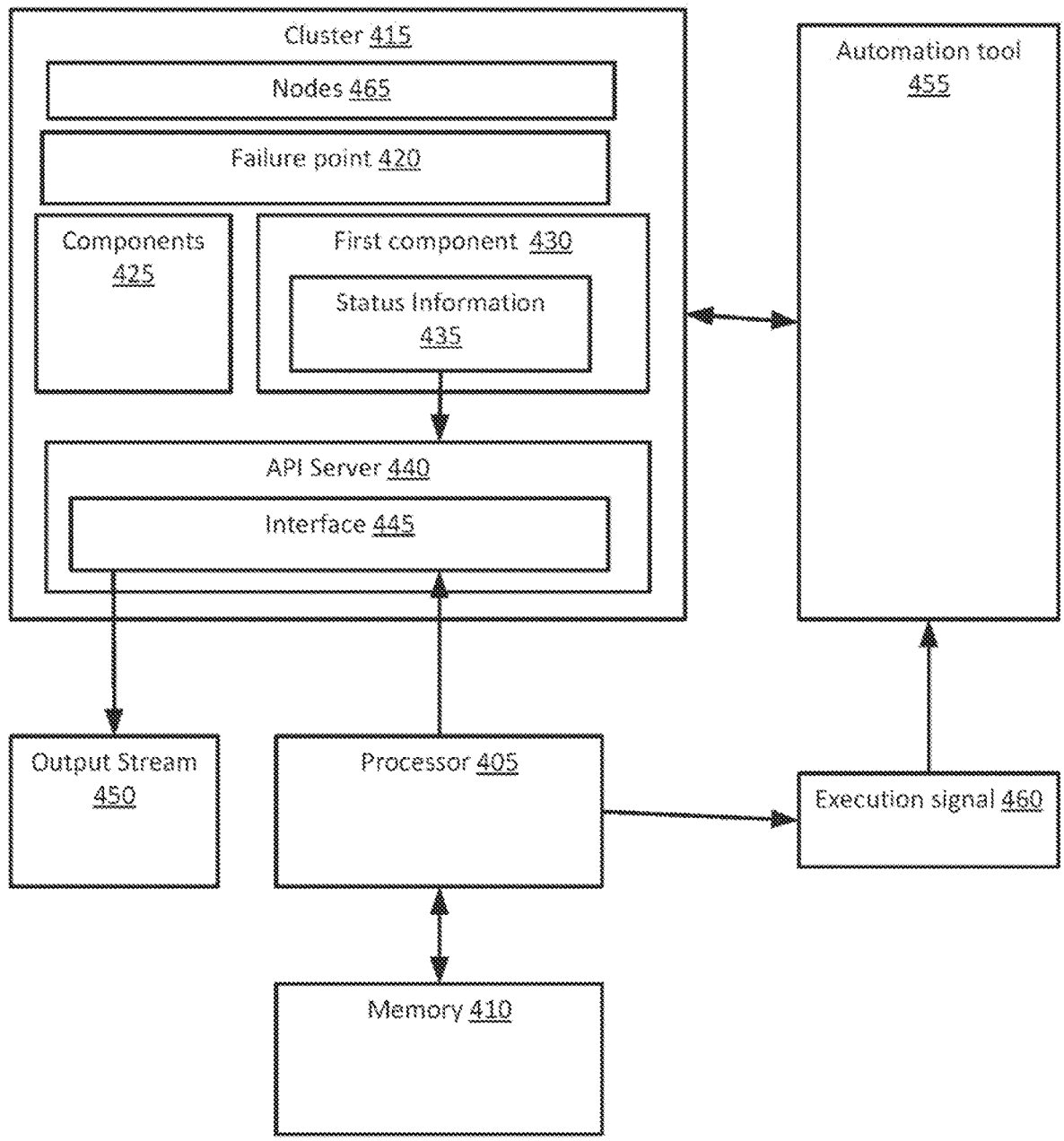
FIG. 4 illustrates a block diagram of an example system monitoring execution of an automation tool in accordance with an embodiment of the disclosure.

FIG. 4 is a block diagram of system 400 which includes a cluster of nodes memory 410 and processor 405. The cluster 415 includes an application programming interface (API) server 440 and one or more components 425. The processor 405 is in communication with the memory 410. The processor is configured to initialize an interface 445 to the API server 440, where the interface 445 is operable to send status information 435 from the one or more components 425 within the cluster 415 via a single output stream 450. The API server 440 is configured, via the interface 445, to modify the single output stream 450 of the one or more components 425 within the cluster, where the single output stream 450 sends the status information 435 external to the cluster 415. The status information 435 is aggregated and based on the aggregated status information 435 received from the API server 440, it is determined whether the cluster 415 is at a failure point 420. In response to determining that the cluster 415 is at a failure point, an execution signal 460 is set to false, where the execution signal 460 is accessible to an automation tool 455 in communication with the cluster 415.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A system, comprising:
   a cluster of nodes, wherein the cluster includes an application programming interface (API) server and two or more components;
   a memory; and
   a processor in communication with the memory, wherein the processor is configured to:
      configure the API server, via an interface, to modify a single output stream of the API server to output status information associated with a first component of the two or more components within the cluster, wherein the single output stream sends the status information external to the cluster;
      aggregate the status information from the two or more components;
      determine, based on the aggregated status information received from the API server, whether the cluster is at a failure point; and
      in response to determining that the cluster is at the failure point, set an execution signal to false, wherein the execution signal is accessible to an automation tool in communication with the cluster, and wherein upon detecting that the execution signal is set to false, the automation tool reduces an amount of stimulus sent to the cluster.

2. The system of claim 1, wherein one or more of the components includes applications executing on the cluster.

3. The system of claim 1, wherein upon detecting that the execution signal is set to false, the automation tool stops sending stimulus to the cluster.

4. The system of claim 3, wherein the stimulus includes inputs to an application executing in the cluster, wherein execution of the application affects the first component.

5. The system of claim 3, wherein the stimulus includes one or more inputs sent to one or more components within the cluster.

6. The system of claim 1, wherein the execution signal is accessible through a Hypertext Transfer Protocol interface.

7. The system of claim 1, wherein the processor is further configured to:
   store the status information external to the cluster.

8. The system of claim 1, wherein the automation tool is stress testing the first component.

9. The system of claim 1, wherein the processor is further configured to:
   in response to determining that the cluster is stable, set the execution signal to true.

10. A method, comprising:
    configuring an application programming interface (API) server, via an interface, to modify a single output stream of the API server to output status information associated with a first component of two or more components within a cluster, wherein the single output stream sends the status information external to the cluster;
    aggregating the status information from the two or more components;
    determining, based on the aggregated status information received from the API server, whether the cluster is at a failure point; and
    in response to determining that the cluster is at the failure point, setting an execution signal to false, wherein the execution signal is accessible to an automation tool in communication with the cluster, and wherein upon detecting that the execution signal is set to false, the automation tool reduces an amount of stimulus sent to the cluster.

11. The method of claim 10, wherein one or more of the components includes applications executing on the cluster.

12. The method of claim 10, wherein upon detecting that the execution signal is set to false, the automation tool modifies stimulus sent to the cluster.

13. The method of claim 12, wherein modifying the stimulus sent to the cluster includes stopping all the stimulus sent to the cluster.

14. The method of claim 12, wherein the stimulus includes one or more inputs sent to one or more components within the cluster.

15. The method of claim 10, wherein the automation tool is executing a chaos test on the cluster.

16. The method of claim 10, further comprising:
    in response to determining that the cluster is stable, setting the execution signal to true.

17. A non-transitory machine readable medium storing code, which when executed by a processing device is configured to:
    configure an application programming interface (API) server, via an interface, to modify a single output stream of the API server to output status information associated with a first component of two or more components within a cluster, wherein the single output stream sends the status information external to the cluster;
    aggregate the status information from the two or more components;
    determine, based on the aggregated status information received from the API server, whether the cluster is at a failure point; and
    in response to determining that the cluster is at the failure point, set an execution signal to false, wherein the execution signal is accessible to an automation tool in communication with the cluster, and wherein upon detecting that the execution signal is set to false, the automation tool reduces an amount of stimulus sent to the cluster.

18. The non-transitory machine readable medium of claim 17, wherein when the code is executed the processing device is further configured to:
    store the status information external to the cluster.

19. The non-transitory machine readable medium of claim 17, wherein when the code is executed the processing device is further configured to:
    in response to determining that the cluster is stable, set the execution signal to true.

\* \* \* \* \*